United States Patent
Ionov

(10) Patent No.: US 7,515,835 B1
(45) Date of Patent: Apr. 7, 2009

(54) SYSTEM, METHOD AND APPARATUS FOR CLOCKLESS PPM OPTICAL COMMUNICATION

(75) Inventor: Stanislav I. Ionov, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 849 days.

(21) Appl. No.: 10/973,696

(22) Filed: Oct. 25, 2004

(51) Int. Cl.
*H04B 10/02* (2006.01)

(52) U.S. Cl. .................. 398/191; 398/146; 398/154

(58) Field of Classification Search ............. 398/146, 398/154, 155, 189, 190, 191
See application file for complete search history.

(56) References Cited

U.S. PATENT DOCUMENTS

| | | | | |
|---|---|---|---|---|
| 3,899,429 | A * | 8/1975 | Ueno et al. | 398/187 |
| 5,113,278 | A * | 5/1992 | Degura et al. | 398/199 |
| 5,208,455 | A | 5/1993 | Nelson et al. | 250/227.19 |
| 5,717,797 | A | 2/1998 | Evans | 385/27 |
| 6,341,023 | B1 * | 1/2002 | Puc | 398/79 |
| 6,388,784 | B1 * | 5/2002 | Nakamura et al. | 398/140 |
| 6,424,773 | B1 | 7/2002 | Watanabe | 385/122 |
| 6,462,860 | B1 | 10/2002 | Ionov | 359/325 |
| 6,466,703 | B1 | 10/2002 | Ionov | 385/10 |
| 6,735,398 | B1 * | 5/2004 | Izadpanah et al. | 398/189 |
| 6,901,177 | B2 | 5/2005 | Ionov | 385/15 |
| 7,149,256 | B2 * | 12/2006 | Vrazel et al. | 375/295 |
| 2003/0219195 | A1 | 11/2003 | Ionov | 385/15 |
| 2005/0013543 | A1 | 1/2005 | Ionov | 385/39 |

FOREIGN PATENT DOCUMENTS

| | | |
|---|---|---|
| EP | 0 521 671 A2 | 1/1993 |
| WO | 01/95526 A2 | 12/2001 |

OTHER PUBLICATIONS

U.S. Appl. No. 10/701,378, filed Nov. 3, 2003, Ionov.
U.S. Appl. No. 11/033,571, filed Jan. 11, 2005, Ionov.
Agraval, G.P., "Optical Solitons," *Nonlinear Fiber Optics,* Chapter Five, Academic Press, New York, pp. 133-152 (1995).
Bigo, S., et al., "All-Optical Fiber Signal Processing and Regeneration for Soliton Communications," *IEEE Journal of Selected Topics in Quantum Electronics,* vol. 3, No. 5, pp. 1208-1222 (Oct. 1997).
Black, H.S., *Modulation Theory,* D. Van Nostrand Company, Inc., New York, pp. 283-298 (1953).
Diez, S., et al., "Gain-Transparent SOA-Switch for High-Bitrate OTDM Add/Drop Multiplexing," *IEEE Photonics Technology Letters,* vol. 11, No. 1, pp. 60-62 (Jan. 1999).

(Continued)

*Primary Examiner*—Christina Y Leung

(57) ABSTRACT

A PPM transmitter includes an optical clock generator for generating equally-spaced optical pulses with a sampling period T; an encoder for transforming an incoming waveform $U(t)$ into a linear combination $V(t)$ of $U(t)$ and a delayed output $V(t-kT)$ according to a rule $V(t)=a(U(t)+V(t-kT))$, where k is a positive integer, $V(t)$ is voltage generated by the encoder and a is a coefficient; and an optical delay generator for delaying optical pulses generated by the optical clock generator in proportion to the voltage $V(t)$, such that $\Delta t_n = bV(t)$, where b is another coefficient and where $\Delta t_n$ is the amount of delay imposed by the optical delay generator. The PPM transmitter functions with a PPM receiver for communicating data without the need to transmit or otherwise provide a clock signal.

8 Claims, 1 Drawing Sheet

OTHER PUBLICATIONS

Haus, H.A., *Waves and Fields in Optoelectronics,* Prentice-Hall, Inc., Englewood Cliffs, New Jersey, pp. 216-220 (1984).

Petermann, K., "Basic Laser Characteristics," *Laser Diode Modulation and Noise,* Kluwer Academic Pubishers, Dordrecht/Boston/London, Chapter 2, pp. 4-59 (1988).

Schubert, C., et al., "160-Gb/s All Optical Demultiplexing Using a Gain-Transparent Ultrafast-Nonlinear Interferometer (GT-UNI)," *IEEE Photonics Technology Letters,* vol. 13, No. 5, pp. 475-477 (May 2001).

Schubert, C., et al., "Comparison of Interferometric All-Optical Switches for Demulitplexing Applications in High-Speed OTDM Systems," *Journal of Lightwave Technology,* vol. 20, No. 4, pp. 618-624 (Apr. 2002).

Wang, D., et al., "Nonlinear Optical Loop Mirror Based n Standard Communication Fiber," *Journal of Lightwave Technology,* vol. 15, No. 4, pp. 642-646 (Apr. 1997).

* cited by examiner

SYSTEM, METHOD AND APPARATUS FOR CLOCKLESS PPM OPTICAL COMMUNICATION

RELATED APPLICATIONS

This application is related to: S. I. Ionov, "A practical design of a PPM receiver with optical top hat pulse generator controlled by solitons", U.S. patent application Ser. No. 10/341,689 filed Jan. 13, 2003 which is based upon U.S. Ser. No. 60/383,343 filed May 23, 2002; I. Ionov "A PPM Demodulator Based on the Gain Dynamics in a SOA", U.S. patent application Ser. No. 10/701,378 filed Nov. 3, 2003; I. Ionov, "PPM demodulator based on PM NOLM with improved conversion efficiency", U.S. patent application Ser. No. 10/735,071 filed Dec. 12, 2003 which is based upon U.S. Ser. No. 60/488,540 filed Jul. 18, 2003; and S. I. Ionov, "Interferometric PPM Demodulators based on Semiconductor Optical Amplifiers", U.S. patent application Ser. No. 11/033,571 filed Jan. 11, 2005. The disclosure of each of the prior-filed applications identified above is hereby incorporated herein by reference.

TECHNICAL FIELD

This disclosure relates clockless pulse position modulation (PPM) communication technology and particularly to optical clockless pulse position modulation communication technology.

BACKGROUND INFORMATION

Many satellite and terrestrial optical communication systems require transmission of analogy optical signals. A straightforward way to address this need is to modulate the amplitude (AM) of an optical carrier. This approach, however, suffers from a poor Signal to Noise Ratio (SNR). It is well known that broadband modulation schemes, which utilize higher bandwidth than that of the transmitted waveform, may improve the SNR over that achieved with AM. Pulse position modulation (PPM) is one of such techniques. In PPM, a shift in the pulse position represents a sample of the transmitted waveform, as shown in FIG. 1. It can be shown that for a given power, $SNR_{PPM} \propto SNR_{AM}(t_p/t)^2$, where $t_p$ is the spacing between un-modulated pulses and t—the pulse duration, respectively. See H. S. Black, "Modulation Theory", D. Van Nostrand Co. (1953).

The implementations of PPM for optical communications require new techniques for generating trains of optical pulses whose positions are shifted in proportion to the amplitude of a transmitted waveform. Typically a bandwidth of $\Delta f=1-10$ GHz and higher is of interest for inter-satellite communications. Since pulse repetition frequencies (PRF) of $1/t_p > 2 \Delta f$ are required for sampling a signal of bandwidth $\Delta f$, GHz trains of picosecond (ps) pulses are required for realizing the advantages of PPM. For example, an optical inter-satellite link designed to transmit waveforms with $\Delta f=10$ GHz bandwidth requires sampling rates of $PRF=1/t_p \geq 2\Delta f=20$ GHz. By employing 1-2 ps-long optical pulses, a 30 dB gain is realized over an AM system with equal optical power.

Optical PPM offers large SNR improvements in power-starved optical links. This technology, however, requires development of new types of optical PPM receivers. The simplest and most basis PPM decoder, which is based on an integrating circuit, suffers from poor performance at low frequencies. See H. S. Black, "Modulation Theory", noted above. Though newly invented PPM decoders overcome the low-frequency shortcomings of the simplest decoder, these improvements come at the cost of higher complexity. See, for example, S. I. Ionov, "Detection of optical analog PPM streams based on coherent optical correlation", U.S. Pat. No. 6,462,860; S. I. Ionov, "A practical design of a PPM receiver with optical top hat pulse generator controlled by solitons", U.S. patent application Ser. No. 10/341,689 filed Jan. 13, 2003 which is based upon U.S. Ser. No. 60/383,343 filed May 23, 2002; I. Ionov "A PPM Demodulator Based on the Gain Dynamics in a SOA", U.S. patent application Ser. No. 10/701, 378 filed Nov. 3, 2003; I. Ionov, "PPM demodulator based on PM NOLM with improved conversion efficiency", U.S. patent application Ser. No. 10/735,071 filed Dec. 12, 2003 which is based upon U.S. Ser. No. 60/488,540 filed Jul. 18, 2003; and S. I. Ionov, "Interferometric PPM Demodulators based on Semiconductor Optical Amplifiers", U.S. patent application Ser. No. 11/033,571 filed Jan. 11, 2005.

In the past, I have utilized an EO delay generator that shifts the temporal position of an optical pulse in proportion to the applied voltage. Such a PPM modulator provides seamless means for a PPM encoding scheme wherein a temporal displacement of an optical pulse from its unmodulated position represents a sample of the transmitted waveform.

More recently, I designed, built and demonstrated a PPM decoder based on the gain dynamics of a semiconductor optical amplifier. When fed by two optical streams—a PPM signal and clock, the decoder produces an electric output that is proportional to the delays between the corresponding signal and clock pulses and changes on the pulse-by-pulse scale.

A PPM communication system based on such an encoder and decoder requires optical clock pulses, which must be either transmitted alongside with the PPM signal or regenerated at the receiver side. This requirement puts an unnecessary burden on the communication system, which requirement is eliminated according to the present disclosure.

BRIEF DESCRIPTION OF THE DISCLOSED TECHNOLOGY

A PPM transmitter includes an optical clock generator for generating equally-spaced optical pulses with a sampling period T; an encoder for transforming an incoming waveform U(t) into a linear combination V(t) of U(t) and a delayed output V(t31 kT) according to a rule V(t)=a(U(t)+V(t−kT)), where k is a positive integer, V(t) is voltage generated by the encoder and a is a coefficient; and an optical delay generator for delaying optical pulses generated by the optical clock generator in proportion to the voltage V(t), such that $\Delta t_n$=bV (t), where b is another coefficient and where $\Delta t_n$ is the amount of delay imposed by the optical delay generator. The PPM transmitter functions with a PPM receiver for communicating data without the need to transmit or otherwise provide a clock signal.

DETAILED DESCRIPTION

Figure 1:
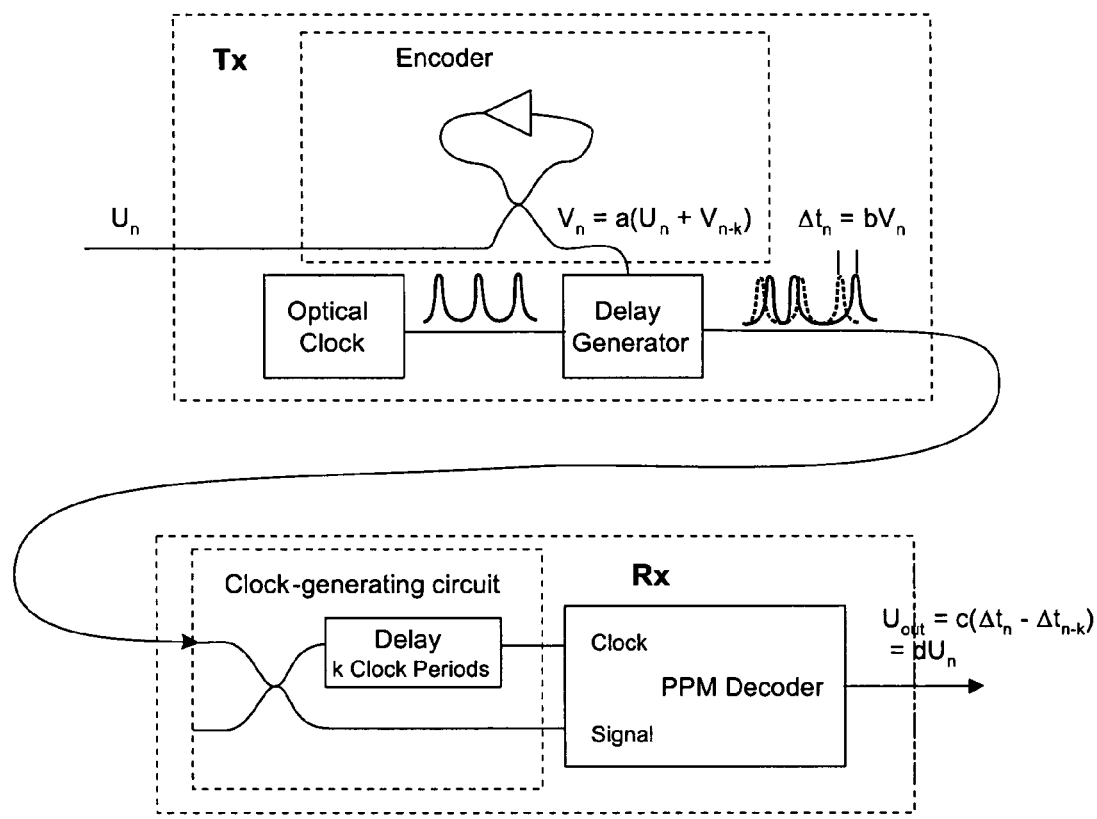
FIG. 1 shows the architecture of the proposed optical encoding/decoding scheme and required apparatus.

FIG. 1 shows the architecture of the proposed optical encoding/decoding scheme and required apparatus. The scheme uses a well-known PPM format, wherein the temporal delay between two consecutive pulses represent a sample of the transmitted waveform. A PPM transmitter (Tx) and receiver (Rx) encode and decode, respectively, a transmitted waveform on (from) an optical carrier according to the chosen PPM format.

The proposed PPM transmitter consists of three major parts:
1. An optical clock that generates equally-spaced optical pulses with the sampling period T.
2. An encoder that transforms the incoming waveform U(t) into a linear combination V(t) of U(t) and a delayed output V(t−kT) according to the rule $$V(t)=a(U(t)+V(t-kT)),\qquad [\text{Eq. 1}]$$

where k is a positive integer, T is the sampling (i.e., optical clock) period and a is a coefficient.

3. A delay generator that delays the optical pulses supplied by the optical clock in proportion to the applied voltage V(t), i.e., $$\Delta t_n = bV(t) = ba(U(t)+V(t-kT)),\qquad [\text{Eq. 2}]$$

where b is another coefficient.

The PPM decoder consists of:
1. A clock-generating circuit that splits the incoming signal into two channels (signal and clock) and delays the latter by k sampling periods;
2. A PPM decoder that converts the delay between the two channels into an electrical waveform $$U_{out}(t)=c(\Delta t_n - \Delta t_{n-k})=cba(V(t)-V(t-kT))=cba(U(t)+V(t-kT)-V(t-kT))=cbaU(t),\qquad [\text{Eq. 3}]$$

i.e., recovers the original waveform U(t).

The optical clock in the PPM transmitter may be any commercially available source, e.g., an optical clock produced by Pritel Inc. or an ERGO pulse generating laser produced by Giga Terra.

An EO delay generator has been described in U.S. Pat. No. 6,466,703 noted above.

In the encoding circuit, the incoming signal U(t) is directed to a first input of a 3 db coupler 10, which divides the signal equally between its two output arms. Since all couplers have losses, the signal at each output of the coupler is $2^{-1/2}\eta U(t)$, where $1-\eta^2 > 0$ accounts for the power loss. One of the outputs is connected to a second input arm of the coupler 10. (It may need to be amplified by an amplifier 12 to account for the connector's losses, but not for the coupler's losses.) The round trip time of the signal in the encoder's loop 14 (including the coupler 10) is chosen equal to kT, where T is the sampling (i.e., optical clock) period and k is an integer. In the most general form, the signals at the output of a single-mode 3 dB coupler 10 are given by $$y_1 = 2^{-1/2}\eta(x_1 + e^{i\phi}x_2),$$

$$y_2 = 2^{-1/2}\eta(e^{-i\phi}x_1 + x_2) = e^{-i\phi}y_1$$

where $x_1, x_2$ are the corresponding input signals, and $\phi$ is a coupling phase shift. See H. A. Haus, "Waves and Fields in Optoelectronics", Prentice-Hall, Englewood Cliffs, 1984, pp. 2271-220. In the present nomenclature, the output signal driving the EO delay generator is V(t), and therefore, the other output is $e^{-i\phi}V(t)$. The input signals are, respectively, U(t) and $e^{i(\psi-\phi)}V(t-kT)$, where $\psi$ is the phase shift acquired by the signal in the loop. Therefore, the corresponding outputs are $V(t)=2^{-1/2}\eta(U(t)=e^{i\phi}e^{i(\psi-\phi)}V(t-kT))$ and $2^{-1/2}\eta(e^{-i\phi}U(t)+e^{i(\psi-\phi)}V(t-nkT))=e^{-i\phi}2^{-1/2}\eta(V(t))$, respectively. Therefore, the condition Eq. 1 is satisfied if $\psi=0$ and $a=2^{-1/2}\eta$.

It is worthwhile mentioning that the round trip transmission through the coupler and the loop containing the amplifier is $2^{-1/2}\eta<1$, and therefore the encoder circuit is a passive device, i.e., it is way below the onset of self-oscillation.

If the connection loss from the second output to the second input of the coupler 10 is small, there is no need for an amplifier 11 in the loop. Let us assume that the transmission is $(1-\beta)$, where $\beta<<1$. In this case, the input signals to the two arms of the coupler 10 are U(t) and $e^{-i\phi}(1-\beta)V(t-kT)$, and the outputs $V(t)=2^{-1/2}\eta(U(t)=V(t-kT))-2^{-1/2}\eta\beta V(t-kT))$ and $e^{-i\phi}2^{-1/2}\eta V(t))$, respectively. The last small term in the output V(t) represents an error (which may be viewed either as distortion or noise). Such a noise shows up in the decoded waveform as an additional term $\beta V(t-kT)\sim\beta V$. The signal to noise ratio (SNR) resulting from this term is $-20\log_{10}\beta$ in dB. Therefore, if one needs to have more than 30 dB in the SNR, one must have $\beta<0.031$.

The clock generating circuit in the PPM receiver can be assembled with standard COTS components—fiber splitters and optical delay lines (adjustable or fixed).

The PPM decoder disclosed in U.S. Ser. No. 10/701,378 filed Nov. 3, 2003 may be used.

From the foregoing description, it will be apparent to those skilled in the art that the present invention has a number of advantages, some of which have been described above, and others of which are inherent in the embodiments of the invention described herein. Also, it will be understood that modifications can be made to the disclosed apparatus described herein without departing from the teachings described herein. As such, the invention is not to be limited to the described embodiments except as required by the appended claims.

What is claimed is:

1. A PPM transmitter comprising:
(i) an optical clock generator for generating equally-spaced optical pulses with a sampling period T;
(ii) an encoder for transforming an incoming waveform U(t) into a linear combination V(t) of U(t) and a delayed output V(t−kT) according to a rule V(t)=a(U(t)+V(t−kT)), where k is a positive integer, V(t) is voltage generated by the encoder and a is a coefficient; and
(iii) an optical-delay generator for delaying optical pulses generated by the optical clock generator in proportion to the voltage V(t), such that $\Delta t_n = bV(t)$, where b is another coefficient and where $\Delta t_n$ is the amount of delay imposed by the optical delay generator.

2. The PPM transmitter of claim 1 wherein the encoder comprises an optical coupler having a first output coupled to a second input thereof and having a second output coupled to the optical delay generator.

3. The PPM transmitter of claim 2 wherein an amplifier is inserted between the first output and the second input of said coupler.

4. The PPM transmitter of claim 2 wherein a first input of the optical coupler receives the incoming waveform U(t).

5. A method of performing PPM comprising:
(i) generating equally-spaced optical pulses with a sampling period T;
(ii) transforming an incoming waveform U(t) into a linear combination V(t) of U(t) and a delayed output V(t−kT) according to a rule V(t)=a(U(t)+V(t−kT), where k is a positive integer, V(t) is voltage generated by an encoder and a is a coefficient; and
(iii) delaying optical pulses generated by an optical clock generator in proportion to the voltage V(t), such that $\Delta t_n = bV(t)$, where b is another coefficient and where $\Delta t_n$ is the amount of delay.

6. The method of claim 5 wherein the transforming occurs in the encoder, the encoder having an optical coupler having a first output coupled to a second input thereof and having a second output coupled to an optical delay generator.

7. The method of claim 6 wherein an amplifier is inserted in a loop between the first output and the second input of said coupler.

8. The method of claim 6 wherein a first input of the optical coupler receives the incoming waveform U(t).

* * * * *